UNITED STATES PATENT OFFICE.

EDWIN TAYLOR, OF BROOKLYN, NEW YORK, ASSIGNOR TO UNION CLAY PRODUCTS COMPANY, OF NEW YORK, N. Y., A CORPORATION OF NEW JERSEY.

ALUMINOUS COMPOSITION.

1,020,781. Specification of Letters Patent. Patented Mar. 19, 1912.

No Drawing. Application filed May 6, 1909. Serial No. 494,487.

*To all whom it may concern:*

Be it known that I, EDWIN TAYLOR, a citizen of the United States, and resident of Brooklyn, in the county of Kings and State of New York, have invented certain new and useful Improvements in Aluminous Compositions, of which the following is a specification.

My invention relates to a certain composition of matter adapted for use for floorings, for coating and covering various articles and materials and for insulating purposes, and is capable of being used in a plastic or semi-fluid condition, or in a molten state, as desired, and having clay for its basis.

In a separate application for Letters Patent No. 494,485, filed May 6, 1909 I have described a composition having clay for its basis and in which the clay is combined with a vulcanized oil and which is adapted for the purposes specified, but it has been found that it is desirable in some cases to secure an additional tensile strength and a greater body to the composition and to secure this result I combine with the clay and vulcanized oil cocoanut fiber, which serves the aforesaid purposes and enable the composition to be used in many situations where it could not otherwise be employed.

The clay is mixed with oil and with sulfur and is subjected to a sufficient degree of heat to vulcanize the oil, the fiber being added either before or after the heating, as may be found most expedient. The condition in which the fiber is added to the other materials depends upon the purposes to which the composition is to be applied. If, for instance, the composition is to be of a fluid or semi-fluid character, the fiber is torn and broken up so as to be in a moist, pulpy condition, and is then thoroughly mixed with the other materials, but in other cases, the fiber may be used almost in its natural state, the fibers being simply separated to such an extent as to effectively combine with the other ingredients. The fiber thus applied to the other ingredients of the composition gives greater body and adds much greater tensile strength, and where the composition is to be used for insulating purposes the cocoanut fiber has a great advantage from itself being a non-conductor. Further, the fiber is extremely cheap, tough and will not decay or deteriorate under the influence of time and moisture like many other fibers, and further it is itself of great tensile strength, and the composition of clay and vulcanized oil has great adhesion to the fibers. The composition thus formed may be softened by heat and may be applied as a paint or as a putty or hardened into shape and used for insulating purposes or for covering floors or roofs or lining tanks and conduits, or for either waterproofing, coating or covering purposes.

Without limiting myself to the proportions specified, I claim as my invention:

1. The within described composition of matter having clay for its basis, the same consisting of clay, cocoanut fiber and vulcanized oil.

2. An aluminous composition consisting of clay, cocoanut fiber, sulfur and oil, the clay being in excess of the other ingredients.

3. The within described composition of matter having clay for its basis, and consisting of clay, cocoanut fiber, sulfur and oil, the oil being vulcanized by the sulfur.

4. The within described composition of matter having clay for its basis, the same consisting of clay, having a content of sulfur, cocoanut fiber and vulcanized oil.

5. An aluminous composition consisting of clay having a content of sulfur, cocoanut fiber and oil, the clay being in excess of the other ingredients.

In testimony whereof I have signed my name to this specification in the presence of the subscribing witnesses.

EDWIN TAYLOR.

Witnesses:
CHARLES E. FOSTER,
CAROLINE E. DAVIDSON.